Oct. 2, 1951

B. D. LEE 2,569,816

ELECTRICAL ANALOGUE

Filed Dec. 1, 1947

INVENTOR.
BURTON D. LEE

BY
Daniel Stryker

ATTORNEY

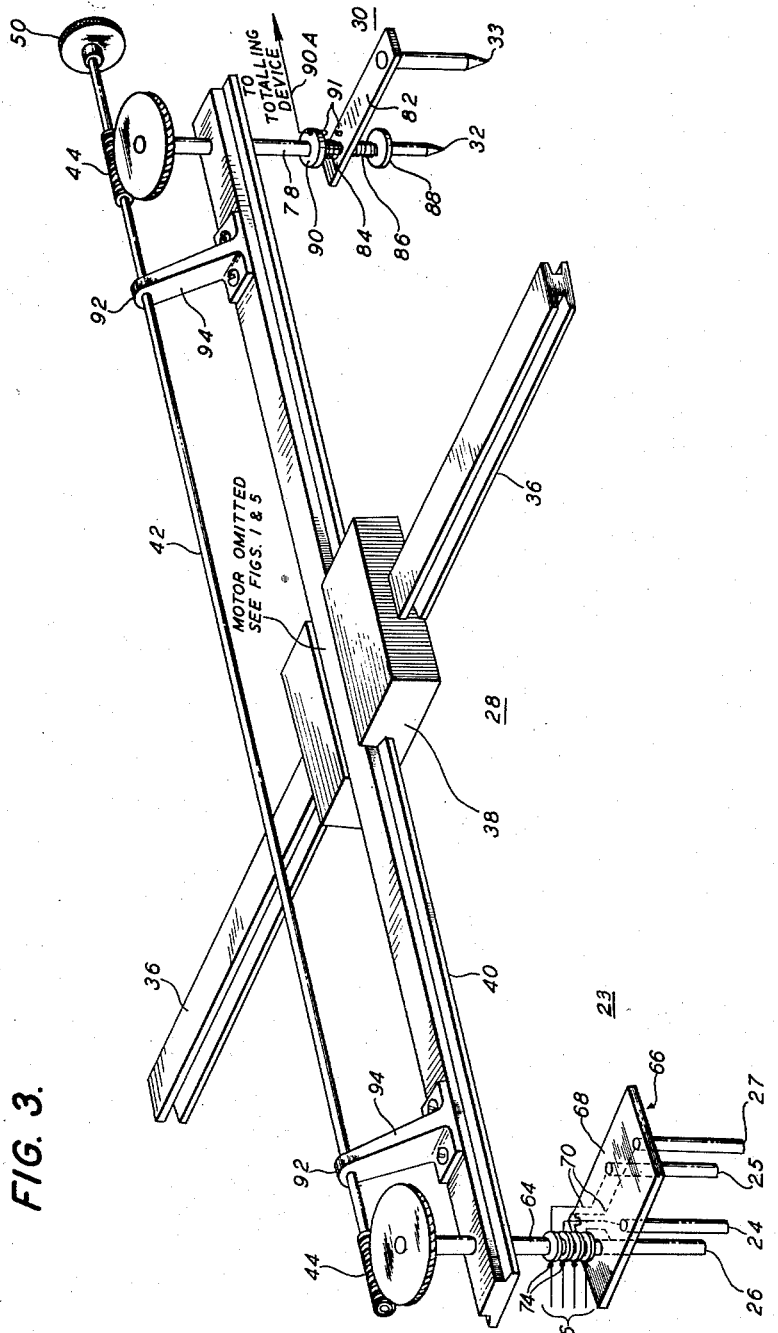

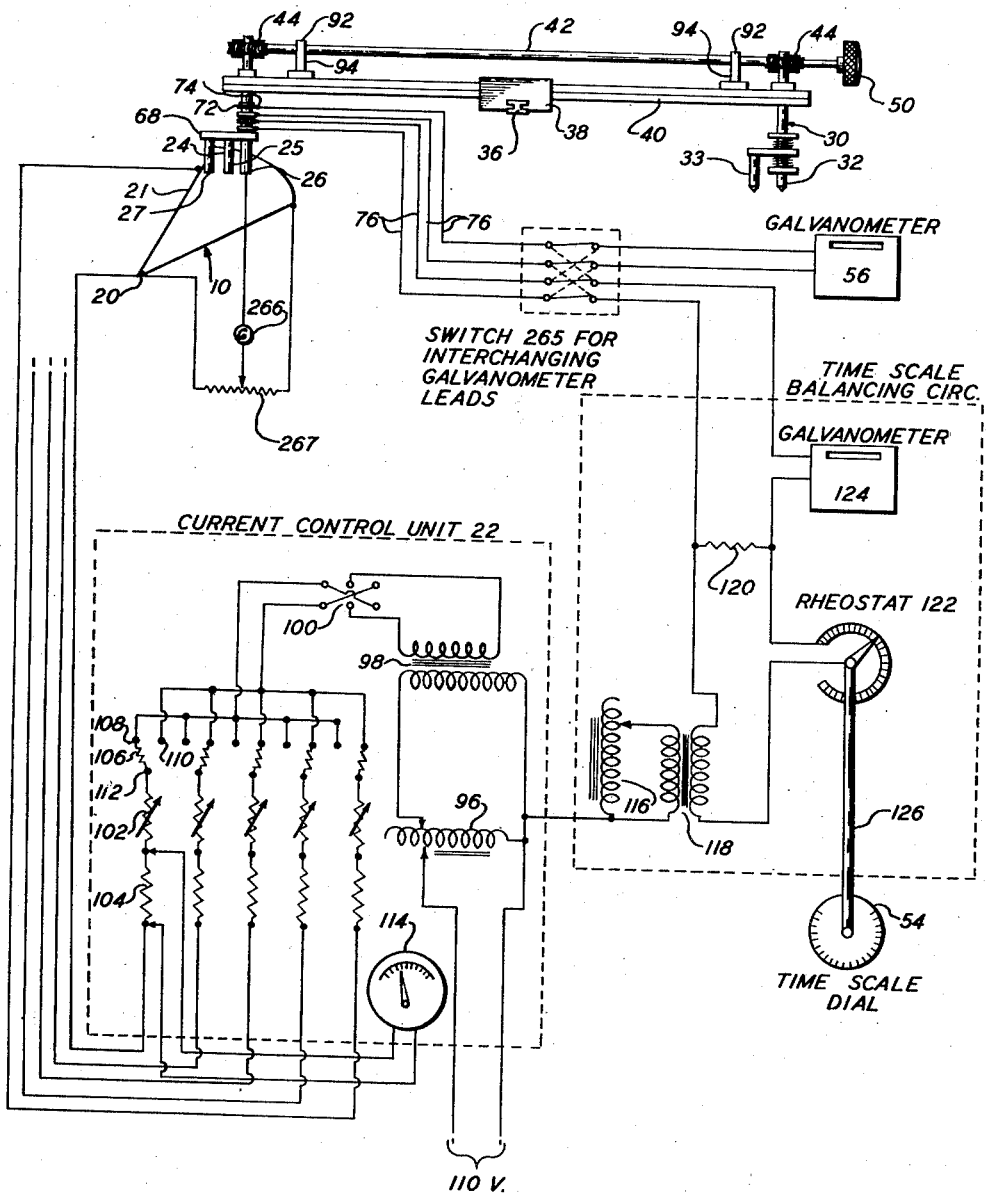

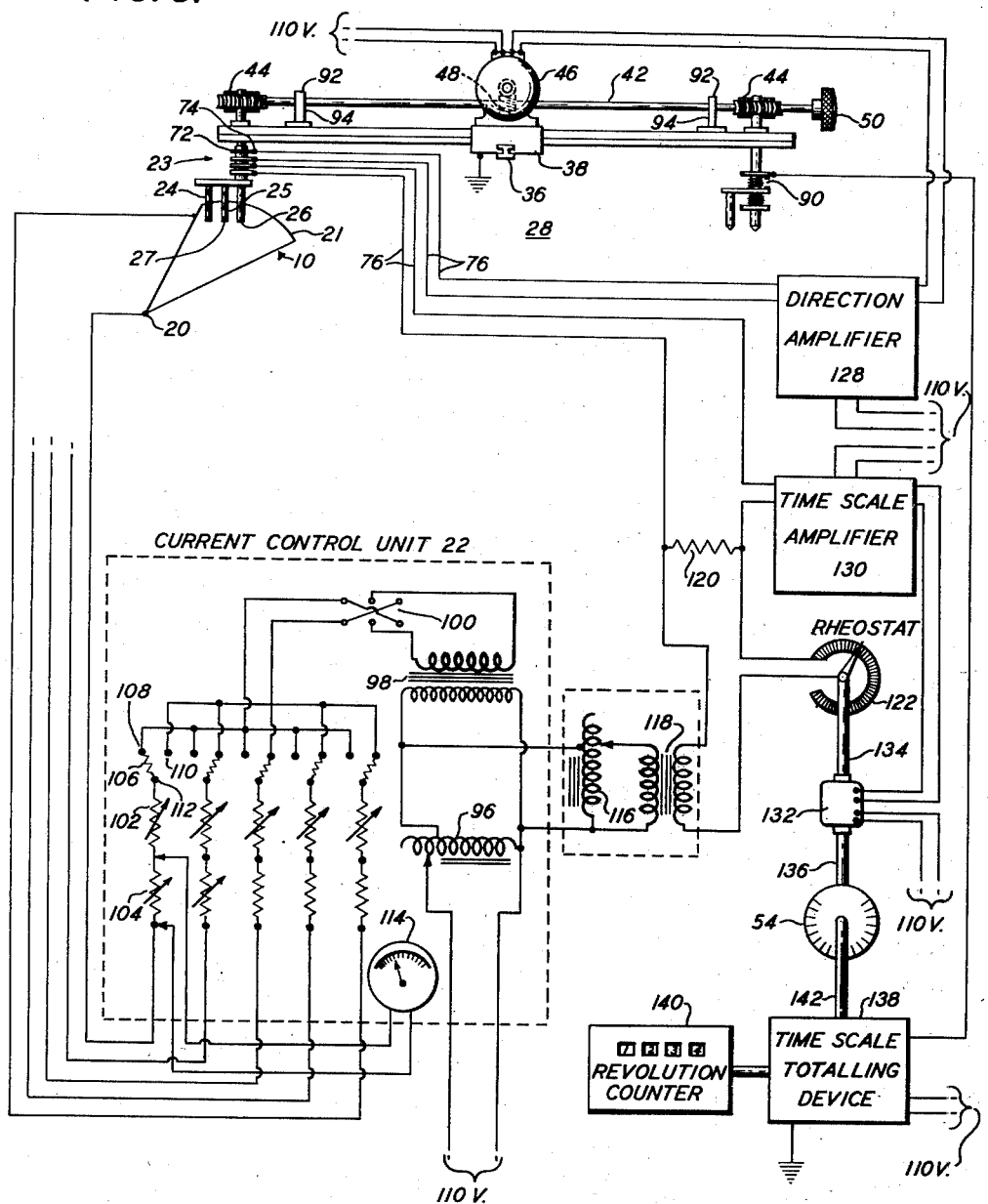

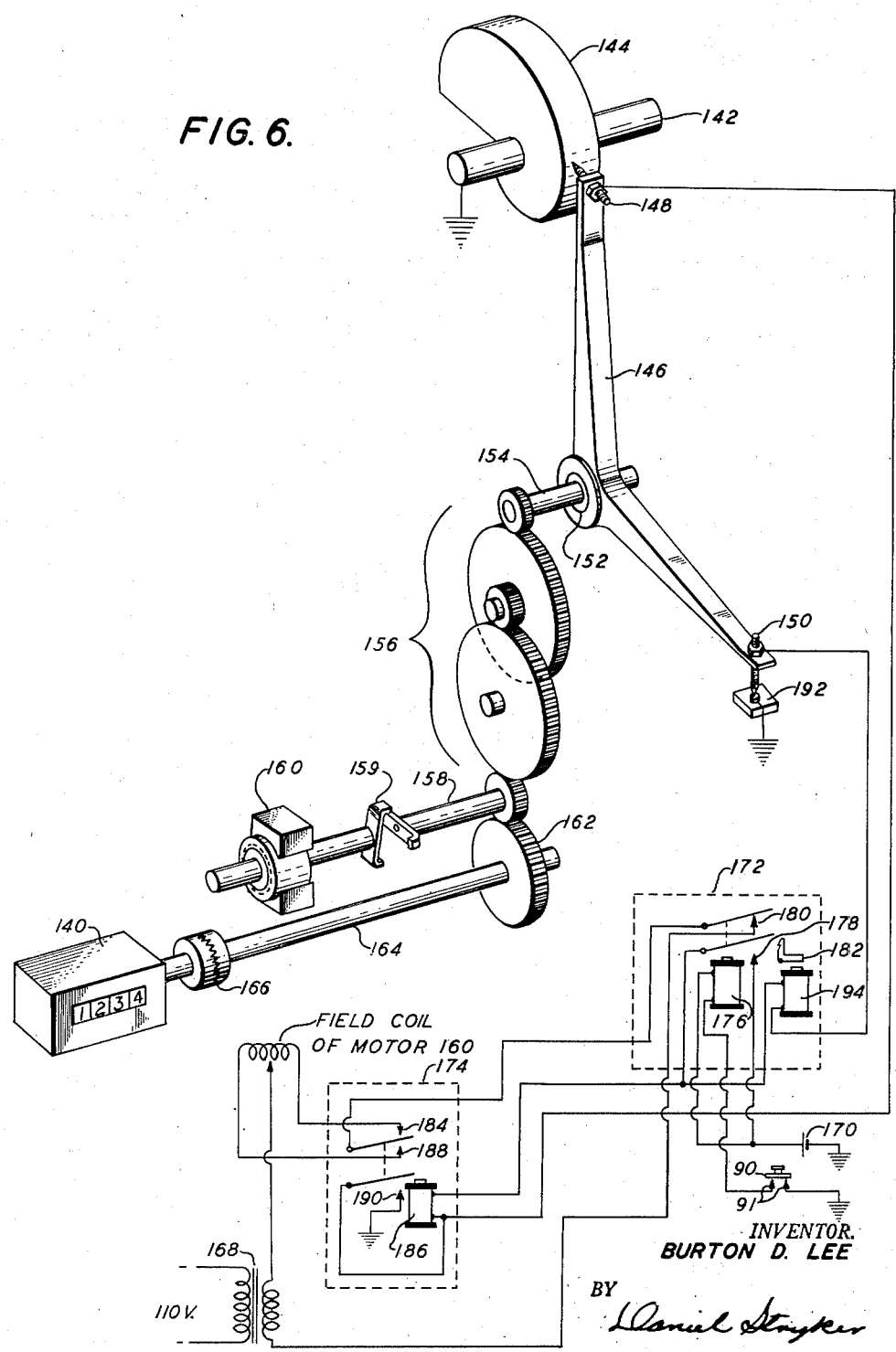

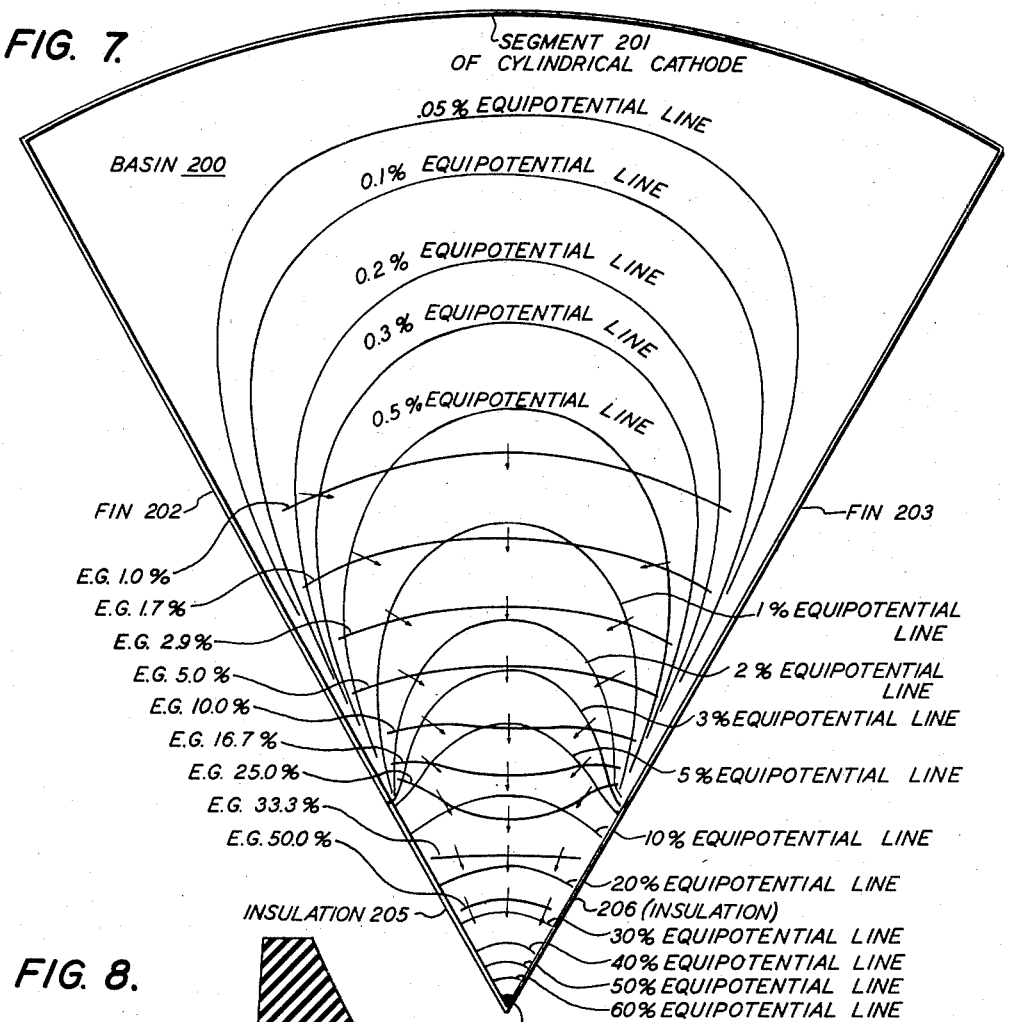
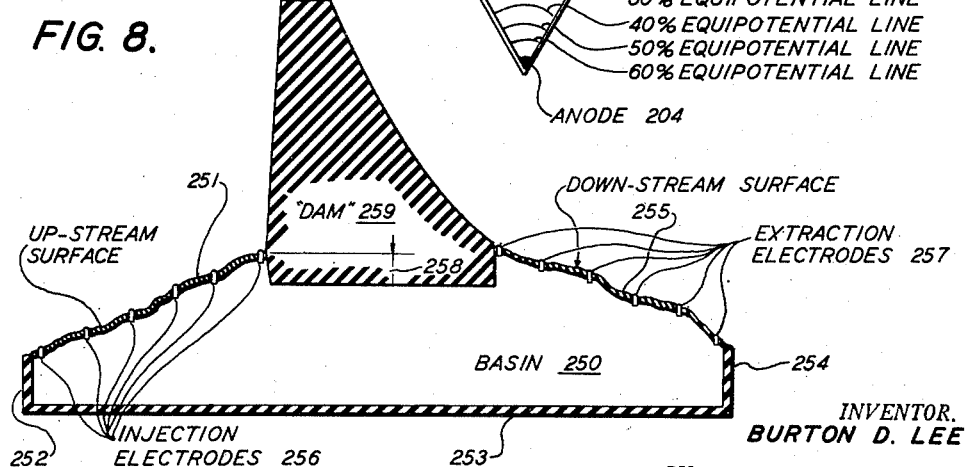

UNITED STATES PATENT OFFICE 2,569,816

ELECTRICAL ANALOGUE

Burton D. Lee, Houston, Tex., assignor to The Texas Company, New York, N. Y., a corporation of Delaware Application December 1, 1947, Serial No. 788,989

4 Claims. (Cl. 235—61)

This invention is concerned with the analysis of mechanical and electrical systems which obey Laplace's equation and provides improvements which greatly facilitate the solution of problems in hydraulics, electrical flow in conductors, the distribution of mechanical stresses in loaded structures, the conduction of heat in solids, and the distribution of flux in magnetic, electrical, and electromagnetic fields. It is directed particularly to the solution of problems arising in the design of hydraulic structures such as dams and to the design of electrical apparatus including condensers, insulators, conductive terminals and electrical discharge devices such as vacuum tubes, radiation counters, electrostatic lenses, etc.

There is a precise analogy between electrical and hydraulic systems which will be understood from the following:

Ohm's law for the flow of electricity is expressed by the equation $$I = -\frac{1}{p} \cdot \frac{\delta E}{\delta x} \quad (1)$$

where $I$ is the current flowing through the unit of area of a section whose specific resistivity is $p$, and across which there is a voltage gradient $\frac{\delta E}{\delta x}$ ($x$ is normal to the area).

Darcy's law for the flow of fluids through porous media is $$V = -\frac{k}{\mu} \cdot \frac{\delta p}{\delta x} \quad (2)$$

where $V$ is the rate of flow of a fluid whose viscosity is $\mu$ through a unit area of a section having a permeability $k$, and across which there is a pressure gradient $\frac{\delta p}{\delta x}$ ($x$ is normal to the area).

The two laws are identical when $$\frac{1}{p}$$

the reciprocal of specific resistivity, is made numerically equal to the ratio of permeability to viscosity, in which case fluid flow becomes directly comparable to current flow and electrical potential becomes directly comparable to pressure.

Electricity, if it be likened to a moving fluid, is incompressible. Consequently Ohm's law (Equation 1) may be combined with the equation of continuity for an uncompressed or incompressible fluid (i. e. one which does not suffer change in volume). The equation can be expressed as follows, for the flow of electricity $$\frac{\delta I}{\delta x} \text{ and } \frac{\delta I}{\delta y} \text{ and } \frac{\delta I}{\delta z} = 0 \quad (3)$$

where $x$, $y$ and $z$ are the coordinates of a three dimensional space taken at right angles to each other.

If Equations 1 and 3 are combined, the result is Laplace's equation viz.

$$\frac{\delta^2 E}{\delta x^2} \text{ and } \frac{\delta^2 E}{\delta y^2} \text{ and } \frac{\delta^2 E}{\delta z^2} = 0 \quad (4)$$

This equation governs the flow of electricity in a homogeneous isotropic conducting medium, but in view of the analogy between the flow of a fluid (which does not suffer change in volume) in a porous medium and the flow of electricity in the conductor, it may be taken as governing such fluid flows as well, i. e. the flow of electricity is analogous to the flow of fluids if the fluid is considered either as incompressible or uncompressed.

As disclosed in co-pending application Serial No. 674,904, filed June 6, 1946, now abandoned, by Alexander Wolf and the present applicant, the foregoing analogy has been applied to the solution of oil and gas field problems through the construction of an electrical analogue. This analogue employs a conductive model, say a pool of electrolyte the shape of which is analogous to that of the petroleum producing structure undergoing investigation. Wells in the structure are represented by electrodes projecting into the model. In the case of a gas condensate field being subjected to a cycling operation, some of the electrodes may represent injection wells and others extraction wells. Potentials impressed across the model are adjusted to simulate injection and extraction rates at the several wells, and exploration of the potential gradients thus set up throughout the conductive model permits accurate mapping of the "invasion front" of the dry gas being pumped into the injection wells to displace wet gas removed through the extraction wells.

Similar analogies may be drawn between the flow of electricity and the conduction of heat in solid thermal conductors, the distribution of mechanical stresses in loaded structures and the distribution of flux in electrical, magnetic or electromagnetic fields and the instant invention contemplates the solution of problems in a number of steady-state dynamic systems. By way of example, field distribution is an important factor in condensers, insulators and in some types of electrically conductive terminals. Shape of the physical elements involved affects the distribution. In accordance with my invention optimum shapes, spacings etc., may be determined accurately in advance by construction of a conductive model, say one having a pool of electrolyte corresponding in shape to a section of the proposed device, which may be the dielectric element of a proposed condenser. Electrical potentials corresponding in magnitude and location to field forces acting upon the section are imposed across the pool, and the pool is then explored with an electrode at a plurality of points so as to determine the potentials at these points. These potentials are a guide to the distribution of field forces to be expected in the proposed condenser.

The process of the invention may also be employed in the determination of optimum sizes and shapes for insulators, conductive terminals and for determining improved shapes and spacings for electrodes etc., in vacuum tubes, radiation counters, etc. It may also be employed to predict accurately the amount and direction of seepage to be expected from dams resting on porous strata etc.

Apparatus such as that described and claimed by Alexander Wolf in co-pending application Serial No. 791,797, filed December 15, 1947, may be employed. However, operations are facilitated through the use of apparatus of the type described and claimed in the aforementioned co-pending application Serial No. 674,904, filed June 6, 1946, by Wolf and Lee.

The conductor of the model may be of the electronic type, i. e. a conductive solid. Electrons are introduced at one or more points in the model and displace free electrons throughout the conductor, so that electrons are forced to move out at another point, with resultant current flow. As indicated above, the conductor may also be of the ionic type, say a pool of electrolyte or an electrolyte dispersed in a body of gel, current flow being dependent upon the mobility of ions through the conductor, but with current flow and potential drop established in the conductor just as in the electronic conductors. In both types of conductors, potentials and potential gradients may be determined by means of probes in contact with the points in question and connected to a potential measuring device such as a galvanometer.

A more comprehensive concept of my invention and its application to a variety of problems may be had from the following detailed description, taken in conjunction with the accompanying drawings in which:

Fig. 3 is a perspective view of the probe, marker head, and the mechanical linkage of these two elements in the apparatus of Fig. 1;

Fig. 4 is a diagram of the circuit employed in the apparatus of Fig. 1 for manual operation;

Fig. 5 is a diagram of the circuit employed in the circuit of Fig. 1 for automatic operation;

Fig. 6 is a diagram illustrating a time-scale totaling device incorporated in the apparatus of Fig. 1;

Fig. 7 is a chart of equipotential lines and lines of equal gradient for the radial fin type radiation counter of Fig. 2 as plotted in accordance with the invention; and Fig. 8 illustrates the application of the invention to the design of a dam structure.

Figure 1:
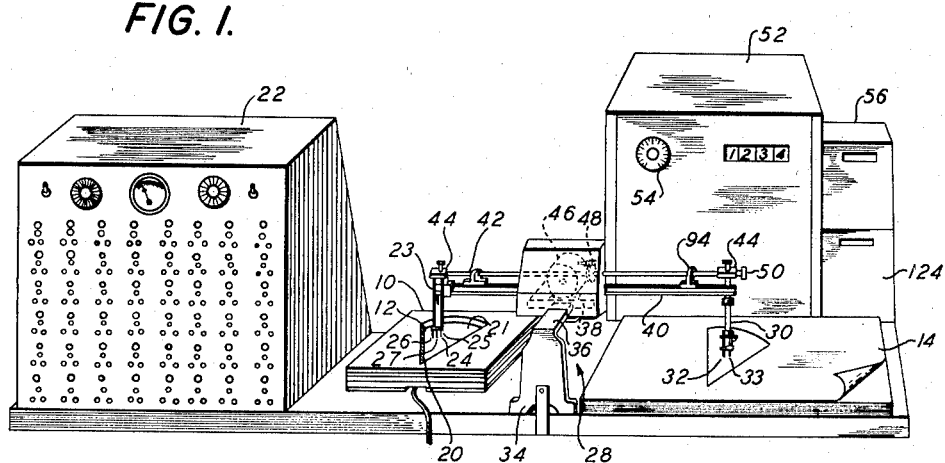
Fig. 1 is a perspective view of apparatus being employed to investigate field distribution in a proposed radiation counter in accordance with the invention.

Referring to Fig. 1, a segment of a proposed fin-type radiation counter is constructed having a conducting pool or basin 12, the geometry of which corresponds to the geometry of a segment of the counter as defined on a corresponding chart 14.

Figure 2:
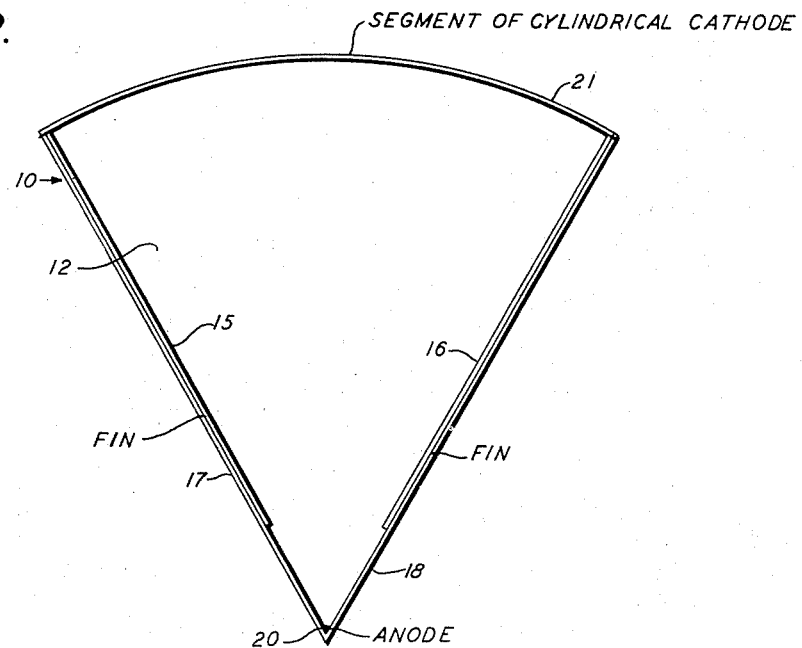
Fig. 2 is the plan of the conductive model being employed in the apparatus of Fig. 1.

The model 10 shown in detail in Fig. 2 comprises a cylindrical conductive segment 21 representing the cathode of the counter, a concentrically disposed anode 20 and two radial fins 15, 16 corresponding to two of the six radial fins in the counter, and connected electrically with the segment 12. The radial fins project inwardly from the cathode toward the anode along the vertical insulating walls 17 and 18 which with the cathode and anode define the basin 12 in which the pool of electrolyte is contained. A model similar to the model 10 is shown in Fig. 7 with the data obtainable by the apparatus of Fig. 1 represented thereon.

By means of a current control unit 22 electric currents are passed through the electrodes 20, 21 and the conducting pool, the magnitude of the potentials bearing a direct relationship to the magnitude of the potentials existing in a radiation counter of this type. A multi-electrode exploring probe 23 is provided with two equipotential probing electrodes 24, 25 and two current flow line probing electrodes 26, 27 which make contact with the conducting pool. The two electrodes 24, 25 lie on a line which intersects at a right angle the line joining the two electrodes 26, 27. The exploring probe 23 is rotatably supported at one end of a supporting device 28. A mapping device 30, rotatably supported at the other end of the supporting device, has tracing points 32, 33 by means of which current flow lines or equipotential lines may be indicated on the chart. The tracing points 32, 33 lie in a line perpendicular to the line joining electrodes 24, 25 and parallel to the line passing through electrodes 26, 27.

The supporting device 28 consists of braces 34 which support a beam 36, a sliding table 38 which is mounted on the beam 36 in such fashion that it may be moved along the length of the beam, and a cross member 40 which in turn is mounted on the sliding table 38 at right angles to the beam and is free to slide lengthwise across the sliding table at right angles to the beam. The exploring probe and the mapping device are also connected together by means of a shaft 42 and worm and pinion gears 44 so that rotational movement of the mapping device about its vertical axis corresponds to rotational movement of the exploring probe about its vertical axis. A phase-sensitive reversible induction motor 46 mounted on the sliding table is geared to the shaft 42 by means of a worm gear 48 to provide means for rotation of the exploring probe and the mapping device under automatic operating conditions. A knob 50 is also provided on the end of the shaft 42 to permit rotation of this shaft when the motor 46 is disengaged and the apparatus is operated manually. A cabinet 52 contains a direction amplifier, a time-scale amplifier, a phase-sensitive induction motor (which operates a calibrated time-scale dial 54), a time-scale totaling device and a revolution counter, all of which are employed for automatic operation of the instrument. The time-scale dial, located on the front of the cabinet 52, is calibrated in time units derived from the reciprocal of the voltage drop across the current flow line electrodes 26, 27. The shaft of the dial 54 is an extension of the shaft of a rheostat located inside the cabinet 52. This rheostat forms part of a balancing circuit so designed that for a reasonable range of voltage between the flow line electrodes 26, 27 the movement of the sliding arm of the rheostat required for achieving balance is very nearly proportional to the change in the reciprocal of the voltage differential between electrodes 26, 27. For manual operation a galvanometer 56 is connected across the equipotential probing electrodes 24, 25 to indicate when these electrodes are located at points of equal electrical potential in the conducting pool 12.

Fig. 3 shows detailed construction of the exploring probe 23, the supporting device 28, and the mapping device 30, already referred to in connection with Fig. 1. The exploring probe has a rotatable vertical shaft 64 supported from the cross member 40. An exploring foot 66 attached to the lower end of the shaft 64 comprises a block 68 of a material such as a phenolic condensation product, i. e. machined Bakelite, in which four tungsten rods (which constitute the probing electrodes 24, 25, 26, 27) are mounted. These electrodes are disposed at the four corners of a rhombus; the equipotential electrodes 24, 25 lying on one diagonal and the current flow line electrodes 26, 27 lying on the other diagonal. The axis of the current flow line electrode 26 is the same as the axis of the vertical shaft 64, so that upon rotation of the exploring probe 23 the other three probing electrodes move in a circular path around the electrode 26. Wires 70 attached to the tops of the four probing electrodes are connected respectively to slip rings 72. Brushes 74 contacting the slip rings are provided in order that electrical connections may be made to the probing electrodes without danger of tangling and breaking the connecting wires.

The mapping device 30 has a rotatable vertical shaft 78 supported from the cross member 40. The lower end of the shaft 78 forms the tracing point 32 and is tapered to a slightly blunted or ball-shaped point to allow it to slide over the surface of the chart. A cross member 82 is slidably connected at one end to the lower portion of the shaft 78, so as to permit vertical movement thereof. This portion of the shaft 78 is grooved to receive a lug or key 84 on the cross member 82, thereby preventing rotational movement of the cross member 82 with respect to the shaft 78. The other end of the cross member 82 supports the sharp tracing point 33. A spring 86 held in place on the shaft 78 by a collar 88 is provided to maintain the normal position of the tip of the tracing point 33 slightly above the surface of the map. A spring-type push button switch 90 positioned on the shaft 78 is provided in order that the sharp tip of the tracing point 33 may be pushed into the surface of the chart during operation of the apparatus and at the same time make an electrical connection at its contact point 91 for operation of a time-scale totaling device described later in connection with Fig. 6.

The position of the exploring probe 23 in relation to the counter model 10 and the position of the mapping device 30 in relation to the chart 14 are always identical due to the construction of the supporting device 28. The main support beam 36, which is laterally grooved on both sides, is maintained in a fixed position by means of the braces 34 shown in Fig. 1. The sliding table 38 has a recess shaped to conform to the cross section of the support beam 36 and is free to move laterally with respect thereto. The sliding table 38 also has another recess shaped to conform to the cross section of the cross member 40 and in which that cross member is free to slide laterally at right angles to the support beam 36.

The shaft 42, which connects the exploring probe and mapping device by means of the identical worm and pinion gears 44, is rotatably supported by bearings 92 in brackets 94, which are mounted on the cross member 40. By adjustment of the worm and pinion gears, the relative position and direction of the transfer points 32, 33 is made to coincide with that of the current flow line electrodes or the equipotential electrodes. Upon rotation of the shaft 42, either manually by means of the knob 50, or automatically by means of the motor 46 shown in Fig. 1, the exploring probe and the mapping device rotate simultaneously, the relative position and direction of the transfer points with respect to the electrodes being identical for any angle of rotation.

Fig. 4 shows the electrical circuit for manual operation of the apparatus. Current is supplied to the electrodes 20 and 21 by means of the current control unit 22. This unit contains a variable autotransformer 96 (for supplying an adjustable source of voltage), an isolation transformer 98, a reversing switch 100, electrode circuits each consisting of a rheostat 102 in series with a precision fixed resistor 104 and a plug-in fixed resistor 106, the value of which is determined by the conditions of the problem. By choosing between sockets 108 and 110, into which one end of the plug-in resistor may be inserted, the direction of current flowing through any fixed electrode may be selected. The other end of the plug-in resistor is inserted in a socket 112. A rectifier type voltmeter 114 is provided for connection across the precision resistor 104 of any electrode circuit by means of a selector switch, not shown, in order that the voltage drop across the precision fixed resistor may be measured and the magnitude of the current flowing in that circuit determined. Although only two of the electrode leads are required to supply electrodes 20 and 21, additional circuits are shown to permit placement of other electrodes in the pool. These additional circuits are employed for example in the embodiment shown in Fig. 8.

The equipotential probing electrodes 24, 25 are connected to a galvanometer 56, which is of the null indicating type and serves to show whether or not the equipotential electrodes are located at points of equal potential in the conducting pool.

The current flow line electrodes 26, 27 are connected to a time-scale balancing circuit so that the voltage differential across these electrodes is in opposition to a fraction of a standard voltage supplied by an autotransformer 116 and a transformer 118. The input side of the autotransformer is connected to the output side of the autotransformer 96, which regulates the voltage supply in the current control unit. By using the voltage supply for the current control unit as a source of the standard voltage, the current supplied to the fixed electrodes of the model may be adjusted to a convenient level without affecting the relativity of time-scale values obtained as readings on the calibrated time-scale 54.

The time-scale balancing circuit includes a fixed resistance 120 across the balancing circuit and a variable resistance or rheostat 122, in series with the standard voltage. The fraction of standard voltage applied across the resistance 120 in opposition to the voltage across the electrodes 26, 27 is adjusted by means of the rheostat 122, until a galvanometer 124 indicates that the two opposing voltages are in balance. In the balanced position the voltage drop across the resistance 120 is equal to the voltage difference between the electrodes 26, 27. The movement of the sliding arm of the rheostat 122 required to obtain this voltage drop across the resistance 120 is approximately proportional to the change in the reciprocal of the voltage difference between the electrodes 26, 27. The time-scale dial 54 is attached to the axis of the sliding arm of the rheostat 122 by a shaft 126, so that the degree of rotation of the sliding arm, and therefore the amount of resistance placed in the standard voltage circuit by the rheostat 122 is indicated by arbitrary calibrations on the dial. Since the distance between the electrodes 26, 27 is very small as compared to the dimensions of the conducting pool 12, the voltage difference between these electrodes may be considered to be a measure of the potential gradient along a current flow line and this potential gradient may be presumed to be essentially constant at an points between these electrodes. Since potential gradient in the conduction model is anologous to the gradient in the system under examination and since the time required for a unit of fluid for example to traverse an incremental length of flow line is proportional to the reciprocal of the pressure gradient, the reciprocal of the voltage difference between the electrodes 26, 27 is proportional to the transit time of an element of fluid along the equivalent incremental length of flow line in the fluid flow system of Fig. 8, for example. The calibrations on the dial 54 therefore represent transit time for the flow of fluid in arbitrary time-scale units which are inversely proportional to the total current supplied to the model and consequently to the total rate of flow of fluid. In the exploration of electrical fields in accordance with the method of the present invention, the time factor has no significance but it is highly desirable to obtain the potential gradients. This may be accomplished by revising the apparatus so that the time-scale dial shows the gradient directly or more simply the time-scale dial may be read and its reciprocal (gradient) obtained mathematically. The position of the current flow line electrodes 26, 27 with respect to the conducting pool is recorded on the chart by means of the mapping device and a line connecting the two points indicated on the chart by the tracing points 32, 33 represents the portion of the current flow line for which the transit time is determined by the reading obtained on the time-scale dial.

Fig. 5 shows an electrical circuit for fully automatic operation of the instrument of Fig. 1 et seq. The circuits for the current control unit 22 and the time-scale balancing circuit for determining the potential difference between the electrodes 26, 27 are the same as described in connection with Fig. 4 for manual operation.

The exploring probe 23 may be made to automatically seek points of equal potential for the probing electrodes 24, 25 by replacing the galvanometer 56 with a direction amplifier 128, which detects and amplifies any voltage difference existing between these "equipotential" electrodes. Any amplifier capable of handling a 60 cycle signal without introduction of excessive harmonic or phase distortion and having sufficient power output to operate the motor 46 may be used. In the particular case illustrated by Fig. 5, the direction amplifier consists of a single voltage amplification stage resistance coupled to a driver stage which in turn is transformer coupled to a power amplification stage consisting of two 6L6 tubes in push-pull class B operation. The output of the amplifier is applied to the shading pole windings of the phase-sensitive induction motor 46 through an impedance matching transformer contained in the amplifier. In the motor 46 (which is of the shading pole induction type commonly known as a servo-motor) excitation of the main field windings is obtained by a 110 volt, 60 cycle power supply and excitation of the two sets of shading coils is obtained by means of the output of the direction amplifier 128. When the shading coils are connected in series the direction of rotation of the motor 46 depends on the relationship of the phase of the currents in the main exciting field and in the shading coils. If a difference in potential exists between the equipotential probing electrodes, this potential difference is amplified and applied to the shading coils of the servo-motor. As a result the armature of the motor 46 rotates. This causes rotation of the exploring probe 23 in a direction tending to reduce the difference in potential between the equipotential electrodes. When an equipotential state is reached no signal is applied to the amplifier and no excitation is applied to the shading coils so that no further rotation of the motor takes place. Because of the mechanical linkage between the exploring probe 23 and the mapping device 30, rotation of the latter is obtained simultaneously so that when a state of equal potentials is reached for the equipotential electrodes, the position of the transfer points 32, 33 with respect to the chart corresponds to the position of the flow line electrodes 26, 27 with respect to the model.

Operation of the calibrated time-scale dial 54 may also be carried out automatically by replacing the galvanometer 124 of Fig. 4 by a time-scale amplifier 130 and providing time-scale phase-sensitive induction motor 132 to simultaneously operate the sliding arm of the rheostat 122 and the time-scale dial 54. Any amplifier capable of handling a 60 cycle signal without introduction of excessive harmonic or phase distortion and having sufficient power output to operate the motor 132 may be used. Fundamentally, the construction of the time-scale amplifier is equivalent to that of the direction amplifier 128. The output of the amplifier 130 supplies power to the shading pole windings of a time-scale motor 132 through an impedance matching transformer contained in the amplifier.

A shaft 134 connects the sliding arm of the rheostat 122 with the shaft of the motor 132, so that rotation of this motor determines the amount of resistance placed in the balancing circuit by the rheostat. If the fraction of the standard voltage opposing the voltage difference across the electrodes 26, 27 is not exactly equal to this voltage difference, this inequality is applied to the amplifier 130 and the amplified signal in turn operates the motor 132 in a direction tending to reduce the inequality in voltages. Thus the sliding arm of the rheostat 122 is moved to a position which will place in the balancing circuit the exact resistance required for voltage balance.

The calibrated time-scale dial 54 is mounted on the shaft 136 (which in turn is connected to the shaft of the motor 132) so that the dial rotates simultaneously and in accordance with the sliding arm of the rheostat 122, thereby indicating in arbitrary time units the position of that sliding arm.

The process of manually recording and totaling all of the time-scale readings observed on the calibrated time-scale dial for the numerous individual operations required for establishing each current line charted during the operation of the apparatus may be eliminated by employing a time-scale totaling device 138 and a revolution counter 140. The former is connected by a shaft 142 to the time-scale dial 54 and is controlled by the position thereof.

The details of the time-scale totaling device are shown schematically in Fig. 6. Referring to this figure, a cam 144, mounted on a shaft 142 is driven by the time-scale 132, and is so shaped that the angle through which a feeler arm 146 must advance from its initial zero position to touch the cam 144 is directly proportional to the reading of the time-scale dial 54 throughout the entire scale. The feeler arm is provided at each end with insulated electrical contact pins 148, 150 and is coupled by a friction drive bearing 152 to a shaft 154, which in turn is coupled through a suitable gear train 156 to a shaft 158, and by means of a disengaging-type coupling 159 to a reversible induction motor 160. The shaft 158 of the motor 160 is also coupled through a suitable gear train 162 to a shaft 164 which drives the revolution counter 140 through a ratchet 166 so that the dials of the counter advance on the forward stroke of the feeler arm toward the cam, but are undisturbed on the reverse stroke of the feeler arm to its original or zero position. The dimensions of the cam and the feeler arm are so chosen that in conjunction with the gear train 156 and the shaft 164 an advance of the feeler arm of approximately two degrees corresponds to one revolution of the shaft 164 and hence to one time-scale unit as recorded by the revolution counter.

The power for operation of the time-scale totaling device is obtained from a 110 volt supply by means of a step-down transformer 168 which supplies the power to operate the reversible induction motor 160. A battery 170 is also provided to supply current for actuation of relays 172, 174.

Operation of the totaling device is started by closing the contacts of the push button 90 located on the mapping device 30. This completes the energizing circuit of a coil 176 of the relay 172, thereby closing contacts 178, 180 which are locked into position by a locking key 182.

The power circuit for operation of the motor 160 is completed through the contact 180 of the relay 172 and a contact 184 of the relay 174. Then the feeler arm 146 advances until it touches the cam 144. When contact is made with the cam, the circuit for energizing the coil 186 of the relay 174 is completed, causing contact 184 to open and the contacts 188 and 190 to close. Opening of the contact 184 breaks the power circuit for the forward operation of the motor 160 and the closing of the contact 188 completes the power circuit for reverse operation of the motor 160, thus returning the feeler arm to its original zero position. Closure of the contact 190 insures energization of the coil 186 and serves as a lock to keep the contact 188 in the "make" position.

When the feeler arm returns to its zero position, contact of the pin 150 with a grounded contact 192 momentarily completes the circuit for energization of a release coil 194 of the relay 172, causing the contacts 178, 180 to open. This in turn deenergizes the coil 186 of the relay 174, opening the contacts 188, 190.

During the return of the feeler arm to its zero position, the counter ratchet 166 slips and the dials of the revolution counter 140 are undisturbed, the final reading on the dials corresponding to the number of time-scale units indicated by the time-scale dial 54.

The operation of the apparatus to obtain the information shown in Fig. 7 is as follows:

The model is constructed to represent a radial fin type radiation counter. The outline of the model corresponds to the geometry of a 60° sector of the counter. The completed model is placed in position under the exploring probe and the leads from the fixed electrodes are connected to the current control unit. The chart is correspondingly placed in position under the mapping device. The conducting pool 12 is filled with a dilute aqueous solution of an electrolyte such as copper sulfate or other ionizable salt. The exact concentration of salt in the solution is not critical but the conductivity of the solution should be low in order that the potential drop between the current flow line electrodes 26, 27 will be of an easily measurable magnitude at low current densities.

The electric current passing through each electrode is adjusted in direct relationship to the potentials in the radiation counter of which the model is an analogue. Adjustment of the individual potentials of each electrode is obtained by means of the variable resistors 102 and the fixed plug-in resistors 106.

The tracing points 32, 33 always conform in angular position to the exploring probes 26, 27. In mapping current flow lines, which are normal to equipotential lines, the probes 24, 25 are used as equipotential probes and probes 26, 27 (which lie on a line perpendicular to that joining probes 24, 25) are used as gradient probes. If however, it is desired to follow an equipotential line rather than a current flow line, the commutating (reversing) switch 265 is thrown so as to connect the probes 26, 27 in the equipotential circuit and the probes 24, 25 to the gradient circuit. The tracing points 32, 33 will then be in a position to map points on the equipotential line.

In determining the conditions prevailing in a discharge device such as a radiation counter or vacuum tube, the shape and location of equipotential lines are of importance. In plotting the equipotential lines shown in Fig. 7, the leads from the flow line probes 26, 27 are connected to the galvanometer 56 by means of the quadruple pole double throw switch 265 (Fig. 4). The electrode 26 of the exploring probe 23 is placed at the desired starting point, ordinarily near the electrode 20 of the model shown in Fig. 2 or the electrode 204 of the model shown in Fig. 7. These electrodes correspond to the anode of the counter in each case.

For manual operation of the instrument to plot these equipotential lines the exploring probe 23 is rotated by turning the knob 50 until the galvanometer 56 connected to the probes 26, 27 registers zero. It will be recalled that probes 26, 27 lie in a line parallel to the line joining the tracing points 32, 33, and for this reason, when the galvanometer registers zero, indicating that the probes 26, 27 are at points of equipotential, the tracing points 32, 33 will define two points on an equipotential line on the chart. The sliding members of the supporting device 28 are then moved so that the tracing point 32 occupies the former position of the other tracing point 33 and the process is repeated until an equipotential line is traced out on the chart as far as desired. A permanent record of the equipotential curve is obtained by drawing a curve through the points of equipotential thus mapped out by the tracing points 32, 33. By repeating the above procedure with different starting locations of the probe 26, a series of equipotential lines may be plotted, as shown on Fig. 7.

To determine the potential along any particular equipotential line, the galvanometer 266 (Fig. 4) is connected between the slider of the potentiometer 267 and one of the exploring electrodes employed to find the equipotential line, say the electrode 26, the end points of the potentiometer being connected between the field electrodes. In this manner the potentials of each of the equipotential lines plotted may be established and recorded as shown in Fig. 7.

To determine and plot the equal gradient lines identified in Fig. 7 by the postscript "E. G.," the leads extending from the probes 26, 27 to the galvanometer 56 are interchanged with the leads extending from the probes 24, 25 by means of the quadruple pole switch 265. The tracing points 32, 33 of the mapping device will then define a portion of a current flow line. This is true because the current flow line lies perpendicular to the line of equipotential as defined by the two probes 24, 25 and because the tracing points 32, 33 are aligned perpendicular to the probes 24, 25.

In manual operation of the instrument for obtaining the current flow lines from which the equal gradient lines are established, the exploring probe is rotated by turning the knob 50 until the galvanometer 56 connected to the exploring electrodes 24, 25, indicates that the exploring electrodes 24, 25 are at points of equipotential, thus swinging the tracing point 33 around the point 32 so that the two define a flow line. The chart is then punched or marked by pressing down the tracing points and the gradient for that portion of the current line defined by tracing points 32, 33 is noted. The sliding members of the supporting device 28 are then moved so that the tracing point 32 occupies the former position of the tracing point 33 and the process is repeated until a current line is established on the chart by a series of dots. A series of current lines may be established by repeating the above procedure from different starting points. A permanent record of each current line may be obtained if desired by drawing a curve through the individual dots in each series mapped out by the tracing points 32, 33. Such a plot is not of particular importance in determination of the conditions prevailing in discharge devices of the type here under consideration.

However, the courses of the current lines are important in establishing the equal gradient lines. In determining points of equal gradient along the various current flow lines, the rheostat 122 is adjusted by means of the knob of the time-scale dial 54 until the galvanometer 124 registers zero. The difference in potential between the flow line electrodes 26, 27 is then read as the gradient between the two.

In this respect the type of apparatus which has been developed for reservoir analysis is normally employed to measure potentials along flow lines and to display a number which is proportional to reciprocal of the gradient between points along the line. The reciprocal of the gradient thus obtained is representative in fluid flow studies of the transit time of the fluid flowing in a porous medium. Such use of the apparatus is described in the aforementioned co-pending application. However, in the investigation of electrical conditions within a counter, as above indicated, the interest is centered in the gradient rather than in its reciprocal and it is important for this reason to establish points of equal gradient along the various current lines. It is possible to revise the apparatus of Fig. 4 so that the gradient rather than its reciprocal may be read directly, but rather than make these electrical and mechanical changes, the dial which indicates transit time may be read and its reciprocal obtained mathematically.

In actual practice, in establishing the equal gradient line, the dial which indicates transit time is read periodically as each current line is being plotted and equal gradient lines are established by connecting points of theoretical equal transit time with a continuous curve. The total transit time at each recorded point on a current line is obtained by adding all increments of transit time (i. e. the transit time for each increment of the current line as defined by the tracing points 32, 33) to that point. This sum is noted on each flow line opposite the corresponding point. To obtain the value of the equal gradient lines thus plotted, the reciprocal of the transit time represented by each of the gradient curves is obtained mathematically from the theoretical transit time represented by that curve.

As indicated above, the equipotential lines and the equal gradient lines are of primary interest when exploring electronic apparatus and the current lines are of secondary interest only in establishing the equal gradient line. However, as shown in Fig. 7, the directions of the current lines are indicated by arrows. The information obtained with the apparatus is a vector quantity, and the direction of the gradient is indicated by the direction of the arrow in each case, and the magnitude of the gradient is shown by each adjacent equal gradient line E. G.

The information plotted on Fig. 7 gives an accurate idea of the field distribution within one segment of the radial fin type radiation counter. The conditions existing in the other segments would be identical. Generally speaking, the information plotted on Fig. 7 indicates that a radial fin type counter of this particular design is not optimum since the field is not well distributed throughout the cross section of the apparatus.

Whereas the information superimposed on the model shown in Fig. 7 is identical with that obtainable from the model shown in Fig. 2, there are certain differences in the two models representative of alternative means of construction thereof. Thus in the model illustrated in Fig. 7, the radial fins 202, 203 projecting inwardly from the segment 201 of the cylindrical cathode serve as retaining walls for the solution in the basin 200. In this model the insulating walls 205, 206 project radially outwardly from the anode 204 to the radial fins 202, 203 forming a continuous surface therewith. The use of this model and the results obtained therefrom are identical to the use of the model shown in Fig. 2.

As already mentioned, various operations can be carried out automatically. For example, the rotation of the exploring probe 23 can be achieved automatically by means of the motor 46 operated by the direction amplifier 128. The balancing of the rheostat 122 can be performed automatically by means of the motor 132 operated by the time-scale amplifier 130. By means of the time-scale totaling device 138 and the revolution counter 140, gradients or time-scale units, being the reciprocal of the gradient, for any specified interval along a current flow line may be computed automatically as the current flow line is traced.

In automatic operation for the determination of current flow lines for example the exploring probe will rotate to obtain a position such that no potential difference exists between the equipotential electrodes 24, 25. As long as any difference in potential exists between these electrodes, it is applied to the direction amplifier 128 and the amplified voltage is applied to the shading coils of the motor 46 to cause rotation of the motor in a direction such that the exploring probe is turned to a position where no difference in potential occurs between the equipotential probes. During the time the exploring foot or probe is thus oriented, the time-scale balancing circuit is also seeking a balance through the adjustment of the rheostat 122, and the rheostat will come to rest shortly after the direction system has reached a balance. This is achieved through the potential balancing circuit and the time-scale amplifier 130 and the motor 132. As long as the fraction of the standard voltage supplied from the transformer 118 in opposition to the potential difference between the flow line electrodes 26, 27 does not exactly balance this potential difference, the difference in voltage is applied to the time-scale amplifier 130, where it is amplified, the amplified voltage being applied to the shading coils of the motor 132. This results in the rotation of that motor in a direction to rotate the sliding arm of the rheostat 122 to a position where the applied fraction of standard voltage exactly balances the potential difference between the flow line electrodes 26, 27.

With both direction and time systems at balance the instrument indicates both the direction of the current flow line by the angular position of the exploring foot and the gradient or equivalent transit time across that section of flow line by the reading of the calibrated time-scale dial 54. This information may be recorded by pressing the push button 90 on the mapping device 30. This simultaneously depresses the tracing point 33 to make a punch mark on the chart and also closes the electrical contacts 91, which cause the time-scale totaling device 138 to register on the counter 140.

Various designs are possible for the potential balancing circuit and the direction and time-scale amplifiers as well as in the probe and the other elements of the apparatus. Likewise, the specific design of the time-scale totaling device is not a limitation of the invention and any equivalent mechanism may be employed. Because of the wide variations in potential gradient which can occur over the surface of the conducting pool it is sometimes desirable to provide two or even more time unit scales to achieve greater accuracy in determining these gradients.

In exploration of other types of electrical equipment by the method herein set forth, a model of the field under consideration is substituted for the model of the radiation counter herein described. For example in the examination of the field characteristics in the dielectric of a condenser, a model conforming in plan to a vertical section of the condenser and having two electrodes representing the plates of the condenser, is employed. Alternatively the field forces developed in a vacuum tube, say a triode, may be ascertained using a circular pool of electrolyte with electrodes therein to represent the filament, grid and plate. It is apparent that by the construction of a proper model the field characteristics of substantially any electrical device may be explored by the method of the present invention.

Another application of the invention to the study of engineering problems is illustrated by Fig. 8 which is a diagram of a model employed for the investigation of seepage problems under a dam resting in a rock formation of slight but known porosity. Both the shape of the dam cross-section and the depth to which it enters the rock formation are factors in reducing seepage, but heretofore design studies employing models have been complicated and uncertain. Improved results are obtained by constructing a model in which the proposed dam cross-section is represented by a block of insulating material and the porous rock by a pool of electrolyte. Thus, as shown in Fig. 8, a basin 250 of insulating material with vertical side walls 251, 252, 253, 254, 255 is closed by another insulating member 259 corresponding in shape to the cross-section of the proposed dam. A plurality of injection electrodes 256 are disposed in the side 251 of the basin (which is shaped to correspond to the upstream surface of the rock) and a plurality of extraction electrodes 257 are disposed in the side 255 of the basin (which corresponds to the downstream surface of the rock). In other words the basin and the dam model, as viewed in plan, simulate a vertical cross-section through the dam and the underlying formation, taken along the line of water flow.

The basin is filled with electrolyte and the injection and extraction electrodes are connected to a current control unit, such as that shown in Fig. 4 or 5 and the potentials are adjusted to simulate hydraulic conditions in the rock formation to which the electrolyte corresponds. Current flow lines and equipotential lines are then investigated and plotted as already described. The control unit 22 as shown in Figs. 4 and 5 is provided with a plurality of circuits, any number being possible, to provide a separate circuit for each electrode. In the illustration of the invention with relation to the radiation counter only two of these circuits were required. However in multiple electrode systems such as a pentode for example, or the dam represented in Fig. 8, a greater number of circuits are required.

In this application of the invention, the calibrated time-scale, i. e. the reciprocal of the potential gradient, is employed to ascertain the rate of liquid flow. Thus it is possible to ascertain in advance not only the path but also the rate of seepage for any given construction.

By varying the distance 258 that the "dam" 259 projects into the "rock formations" or basin and by changing the shape of the "dam," at its contact with the formation and by making electrolytic model studies in each case, the optimum design of a dam may be determined.

I claim:

1. In determining field distribution in an electrical device, the improvement which comprises imposing on a pool of electrolyte corresponding in shape to a section of the device electrical potentials corresponding in magnitude and location to field forces acting upon the section, exploring the pool by moving at least one electrode therein in a direction corresponding to that extending across the section to locate a line of equipotential points in the pool, moving the electrode similarly in the pool to locate another line of equipotential points differing from the potential of the first line, plotting current flow lines normal to the equipotential lines thus located on a chart of the section, locating points of equal electrical gradient on the flow lines in the pool thus located by electrical measurement of the gradient along the lines, and plotting the points of equal gradient thus located on the chart.

2. In determining field distribution in an electrical device, the improvement which comprises imposing on a pool of electrolyte corresponding in shape to a section of the device electrical potentials corresponding in magnitude and location to field forces acting upon the section, locating two points on a first equipotential line in the pool extending in a direction corresponding to that across the section, simultaneously locating on a chart of the section two spaced points defining a flow line corresponding to a portion of a current flow line perpendicular to the first equipotential line in the pool defined by the two points thereon, thereafter locating two points on a second equipotential line in the pool extending in a direction corresponding to that across the section but spaced from the first equipotential line and passing through a point corresponding in location in the pool to the location of one of the two spaced points previously located on the chart, simultaneously locating on the chart an extension of the flow line previously located thereon, the extension being defined by one of the spaced points and a third spaced point on the chart corresponding in location to a point on a line drawn perpendicular to the second equipotential line in the pool, measuring the potential gradients between the points in the pool corresponding to the spaced points on the chart, and locating points of equal potential gradient on the chart.

3. In determining liquid flow through a porous body, the improvement which comprises imposing on a pool of electrolyte corresponding in shape to a section of the body electrical potentials corresponding in magnitude and location to the hydraulic forces tending to cause liquid flow through the section, locating two first points on a first equipotential line in the pool and extending in a direction corresponding to that across the section, simultaneously locating on a chart corresponding to the section a portion of a flow line defined by two spaced points perpendicular to the equivalent position of the two first points in the pool, thereafter locating two points on a second equipotential line in the pool offset from the first equipotential line and passing through a point in the pool corresponding in position to that of one of the spaced points on the chart, simultaneously locating on the chart a continuation of the flow line perpendicular to a line through the equivalent positions on the chart of the points on the second equipotential line in the pool and defined by said one of the spaced points on the chart and a third spaced point on the chart, measuring the potential gradients between the points in the pool corresponding to the spaced points on the chart, and locating points of equal potential gradient on the chart.

4. In apparatus for plotting field distribution, the combination which comprises a potentiometric model including a pool of electrolyte corresponding in shape to a system in which the field is distributed and means for imposing on the pool electrical potentials corresponding in magnitude and location to forces acting upon the system, a probe head mounted adjacent the pool and carrying at least three probes in contact with the pool, one set of two of the probes defining a line transverse to a line drawn through a different set of two of the probes, a chart, a marker head disposed adjacent the chart, means for laterally moving the probe head and the marker head in unison, means for rotating the probe head and the marker head in unison, two markers on the marker head corresponding in orientation to two of the probes on the probe head, potential measuring means, and switching means for connecting the potential measuring means to either of the probe sets.

BURTON D. LEE.

REFERENCES CITED

The following references are of record in the file of this patent:

UNITED STATES PATENTS

| Number | Name | Date |
| --- | --- | --- |
| 1,918,001 | Stone | July 11, 1933 |
| 2,423,754 | Bruce | July 8, 1947 |

OTHER REFERENCES

"Some Applications of Field Plotting," by E. O. Willoughby; I. E. E. Journal, vol. 93, part 3, July 1946, pp. 287–291.

"Conformal Transformation with the Aid of an Electrical Tank," by Bradfield, Hooker and Southwell; Proceedings of the Royal Society of London, vol. 159–A, April 1, 1937, pp. 315–346.

"Automatic Plotting of Electrostatic Fields," by Paul E. Green, Jr., Review of Scientific Instruments, vol. 19, #10, October 1948, pp. 646–653.

"Automatic Equipment and Techniques for Field Mapping," by J. K. Muckelsen, Gen. Elec. Review, November 1949, pp. 19–23.